United States Patent [19]

Anderson

[11] Patent Number: 4,937,672
[45] Date of Patent: Jun. 26, 1990

[54] AUDIO SWITCHING FOR AN AUDIO/VIDEO SYSTEM HAVING S-VIDEO CAPABILITY

[75] Inventor: Mark R. Anderson, Indianapolis, Ind.

[73] Assignee: RCA Licensing Corporation, Princeton, N.J.

[21] Appl. No.: 340,147

[22] Filed: Apr. 14, 1989

[51] Int. Cl.[5] .................... H04N 5/268; H04N 5/60; H04N 7/18
[52] U.S. Cl. .................................. 358/181; 358/198; 358/93
[58] Field of Search ................. 358/181, 185, 198, 85, 358/93

[56] References Cited

U.S. PATENT DOCUMENTS

| 3,686,698 | 8/1987 | Tompkins et al. | 358/181 |
| 3,876,864 | 4/1975 | Clark et al. | 358/93 |
| 4,814,883 | 3/1989 | Perine et al. | 358/181 |

OTHER PUBLICATIONS

RCA/GE Color Television Service Data CTC 148/149.

Primary Examiner—John K. Peng
Attorney, Agent, or Firm—Joseph S. Tripoli; Peter M. Emanuel; Thomas F. Lenihan

[57] ABSTRACT

An audio/video signal switching system permits an audio input to be automatically switched from a mode in which it receives audio signals associated with an NTSC signal source, to a mode in which it receives audio signals associated with an S-VIDEO signal source.

7 Claims, 5 Drawing Sheets

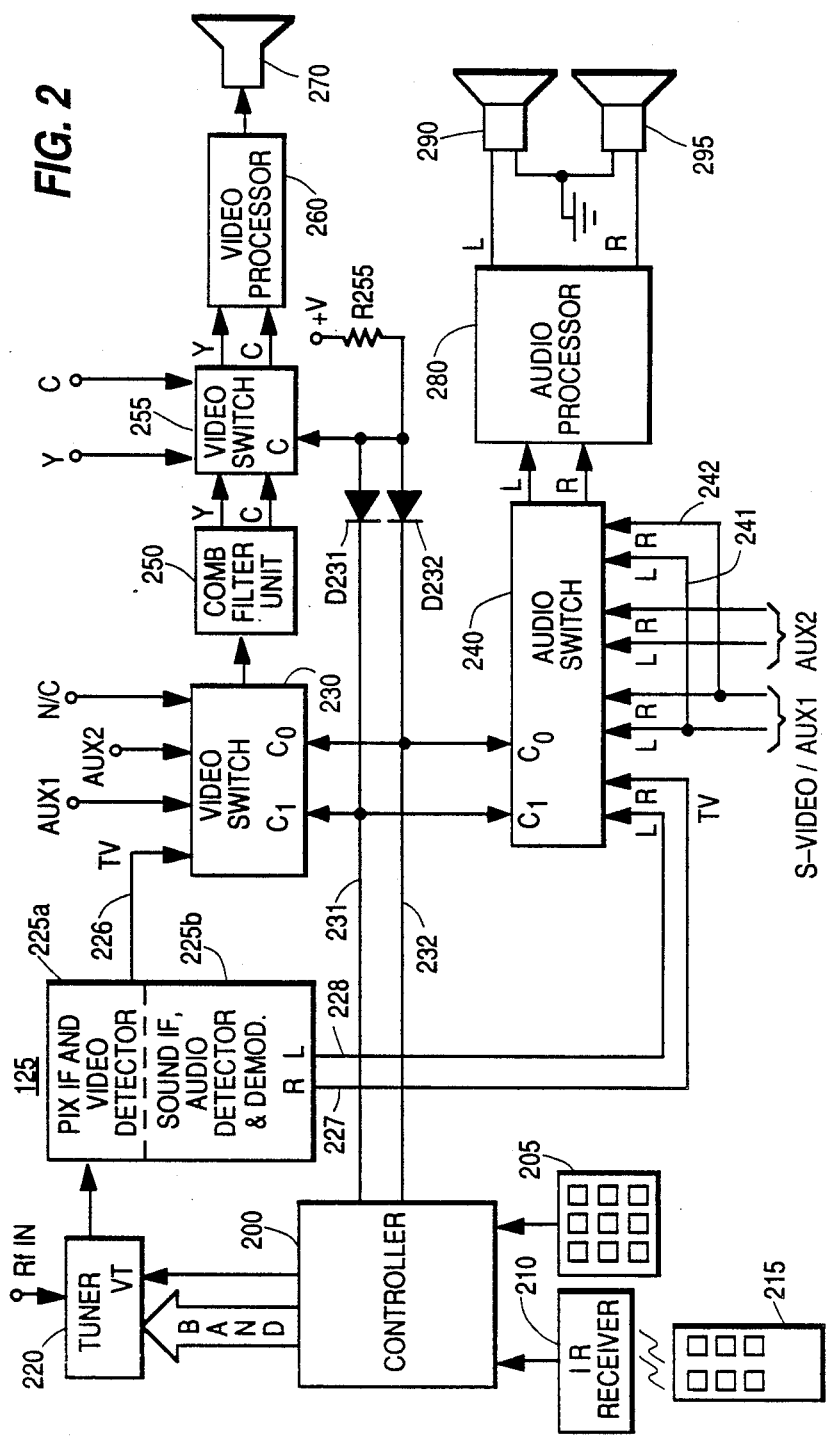

| CONTROL CODES | | VIDEO SOURCES | | | AUDIO SOURCES | | |
|---|---|---|---|---|---|---|---|
| C1 | C0 | TV | AUX1 | AUX2 | S-VIDEO | TV | AUX1 | AUX2 |
| 0 | 0 | X | | | | X | | |
| 0 | 1 | | X | | | | X | |
| 1 | 0 | | | X | | | | X |
| 1 | 1 | | | | X | | X | |

*FIG. 3*

AUDIO SWITCHING FOR AN AUDIO/VIDEO SYSTEM HAVING S-VIDEO CAPABILITY

FIELD OF THE INVENTION

This invention relates to the field of signal switching arrangements in audio-video systems.

BACKGROUND OF THE INVENTION

The term "television receiver" as used herein includes television receivers having a display device (commonly known as television sets), and television receives without a display device, such as videocassette recorders (VCR's) and remote controlled audio-video switchers.

The term "television receiver" as used herein also includes television monitor/receivers having an RF tuner and baseband signal input circuitry.

Modern television receivers allow selection of external baseband audio and video signals from audio and video sources such as VCR's and videodisc players, as well as selection of broadcast television programs tuned and demodulated by built-in tuner and intermediate frequency (IF) circuitry.

The external audio and video signals are coupled to individual input terminals (jacks) of a connection panel usually located on the rear portion of the television receiver. These input terminals, and the output terminals of the internal tuner/IF circuitry, are coupled to the signal processing circuits of the television receiver via a signal switch assembly. Such a switch assembly is desirably electronically controlled to select the proper audio signal which corresponds to a selected video signal.

A television receiver having multiple electronically selectable auxiliary baseband signal inputs is known from the RCA CTC-149 manufactured by Thomson Consumer Electronics, Inc. Indianapolis, Ind. This television receiver employs digital switching logic to automatically provide proper audio when each of the video source selections is made (i.e., tuner, AUX1 or AUX 2). However, this receiver does not have S-VIDEO (i.e, Super Video, a wideband video format) capability.

An S-VIDEO signal source, such as a VCR or a Camcorder, provides wideband luminance and chrominance signals on separate terminals of an S-VIDEO connector. The S-VIDEO connector is different than the coaxial baseband connectors normally used in industry. Audio signals in an S-VIDEO system are provided via standard coaxial connectors, because these signals do not differ from the normal audio signals provided by standard television signal sources.

S-VIDEO signals cannot be selected by the video switching circuitry described above with reference to the RCA CTC-149 television receiver, because the S-VIDEO wideband luminance (Y) signal and chrominance (C) signal are applied to the different areas the television receiver than are the standard baseband video signals.

SUMMARY OF THE INVENTION

It is herein recognized that it is not necessary or economically desirable to provide separate audio input terminals on an S-VIDEO capable television receiver for the audio signals produced by an S-VIDEO signal source device, if the television receiver already includes standard baseband audio signal input terminals. Specifically, a television receiver includes a multiple input video switch, a baseband video/S-VIDEO selector switch, and a multiple input audio switch, collectively forming an audio/video switching arrangement. An audio input terminal is connected to the audio/video switching arrangement such that it is automatically selectable in either a standard NTSC mode, for coupling audio signals associated with standard baseband video signals or in an S-VIDEO mode for coupling audio signals associated with S-VIDEO signals.

BRIEF DESCRIPTION OF THE DRAWING

FIGS. 2 and 2a illustrate partially in block diagram form and partially in schematic form, embodiments of the invention.

FIG. 3 illustrates, in tabular form, the signal sources selected by the circuitry of FIG. 2 in response to various control codes.

DETAILED DESCRIPTION OF THE EMBODIMENT

Figure 1:
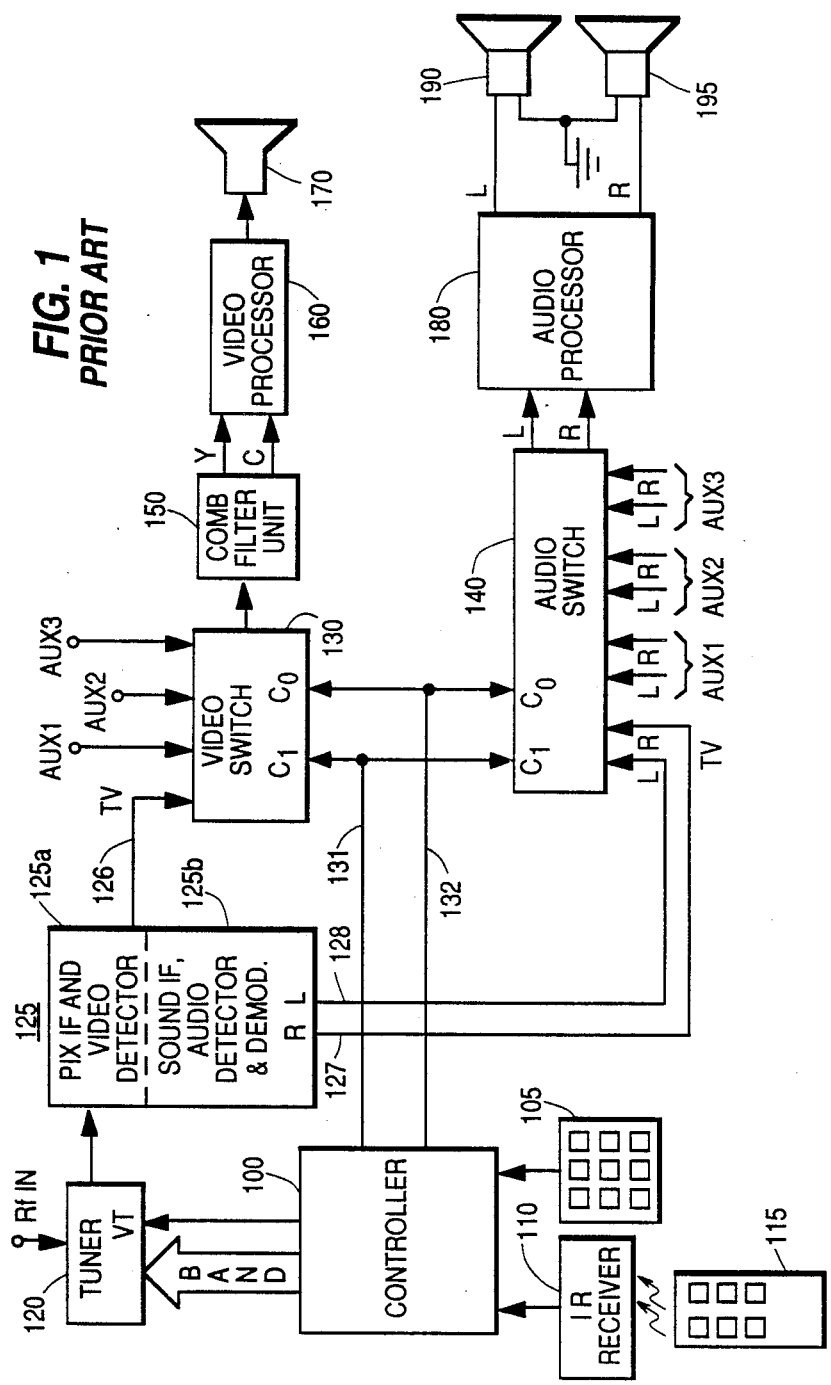
FIG. 1 illustrates, in block diagram form, a switching system of the prior art.

Referring to prior art FIG. 1, a controller 100 receives user-entered control signals from a local keyboard 105 and from an infrared (IR) receiver 110. IR receiver 110 receives and decodes remote control signals transmitted by a remote control unit 115. Controller 100, which may be a microprocessor or microcomputer, causes a television tuner 120 to select a particular RF signal to be tuned in response to data entered by a user. Tuner 120 produces a signal at an intermediate frequency (IF) and applies it to a processing unit 125 comprising a first section 125a including a picture (PIX) amplifying stage and video detector, and a second section 125b including, a sound amplifying stage, an audio detector and a stereo decoder. Processing unit 125 produces a baseband video signal (TV), and baseband left and right audio signals.

The baseband video signal (TV) is coupled via line 126 to one input of a four input video switch 130. The baseband left and right audio signals are applied to one pair of inputs of an audio switch 140 capable of selecting a pair of inputs from four pairs of audio inputs. Video switch 130 and audio switch 140 each have three other inputs labelled AUX1, AUX2 and AUX3, for receiving respective baseband video and audio signals from external sources. Each of the inputs of video switch 130 and audio switch 140 is selectable in response to binary signals generated by controller 100 and applied to control inputs $C_1$ and $C_0$ via conductors 131 and 132, respectively. For example, if $C_1$ and $C_0$ are both caused to be at a low signal level (i.e. binary 00), then the TV input is selected. If $C_1$ is low and $C_0$ high (binary 01), then AUX1 is selected. If $C_1$ is high and $C_0$ low (binary 10), then AUX2 is selected. If both $C_1$ and $C_0$ are high (binary 11), then AUX3 is selected. The selection of corresponding video and audio signals is ensured because the control lines 231 and 232 are coupled to respective control inputs $C_1$ and $C_0$ of both video switch 130 and audio switch 140.

The selected video signal is applied to a comb filter unit 150 which separates luminance (Y) signals and chrominance (C) signals for application to a video processor unit 160 for ultimate display on a display screen of a display device 170. The selected audio signals are applied to an audio processor unit 180 and ultimately reproduced via speakers 190, 195. The above-described circuitry is essentially known from the RCA CTC-149 television receiver manufactured by Thomson Consumer Electronics, Inc., Indianapolis, Ind.

A preferred embodiment of the subject invention will now be described with respect to FIGS. 2, 3, and 4. Similarly numbered elements in FIG. 2 accomplish the same functions as their counterparts in FIG. 1, and therefore these functions need not be described again.

Referring to FIG. 2, a video signal switch unit 255 is shown inserted between comb filter 250 and video processor 260.

The structure of FIG. 2 provides for selection of the proper audio signal in response to control signals applied to parallel-connected control inputs $C_1$ and $C_0$ of video signal switch 230 and audio signal switch 240, and also in response to a signal indicative of whether S-VIDEO signals are selected.

Specifically, this is accomplished by the addition of resistors R255, and diodes D231, and D232. Respective control inputs $C_1$ and $C_0$ of audio switch 240 are directly connected to the control inputs $C_l$ and $C_0$ of video switch 250, as shown in FIG. 2. The cathode of diode D231 is coupled to the junction of control inputs $C_1$ of both audio switch 240 and video switch 250. The cathode of diode D232 is coupled to the junction of control inputs $C_0$ of both audio switch 240 and video switch 250. The anodes of diodes D231 and D232 are connected together, to a control input C on video switch unit 255, and to one end of resistor R255, the other end of which is connected to a source of positive supply voltage.

The operation of the circuitry of FIG. 2 will be explained with respect to FIGS. 3 and 4.

Figure 4:
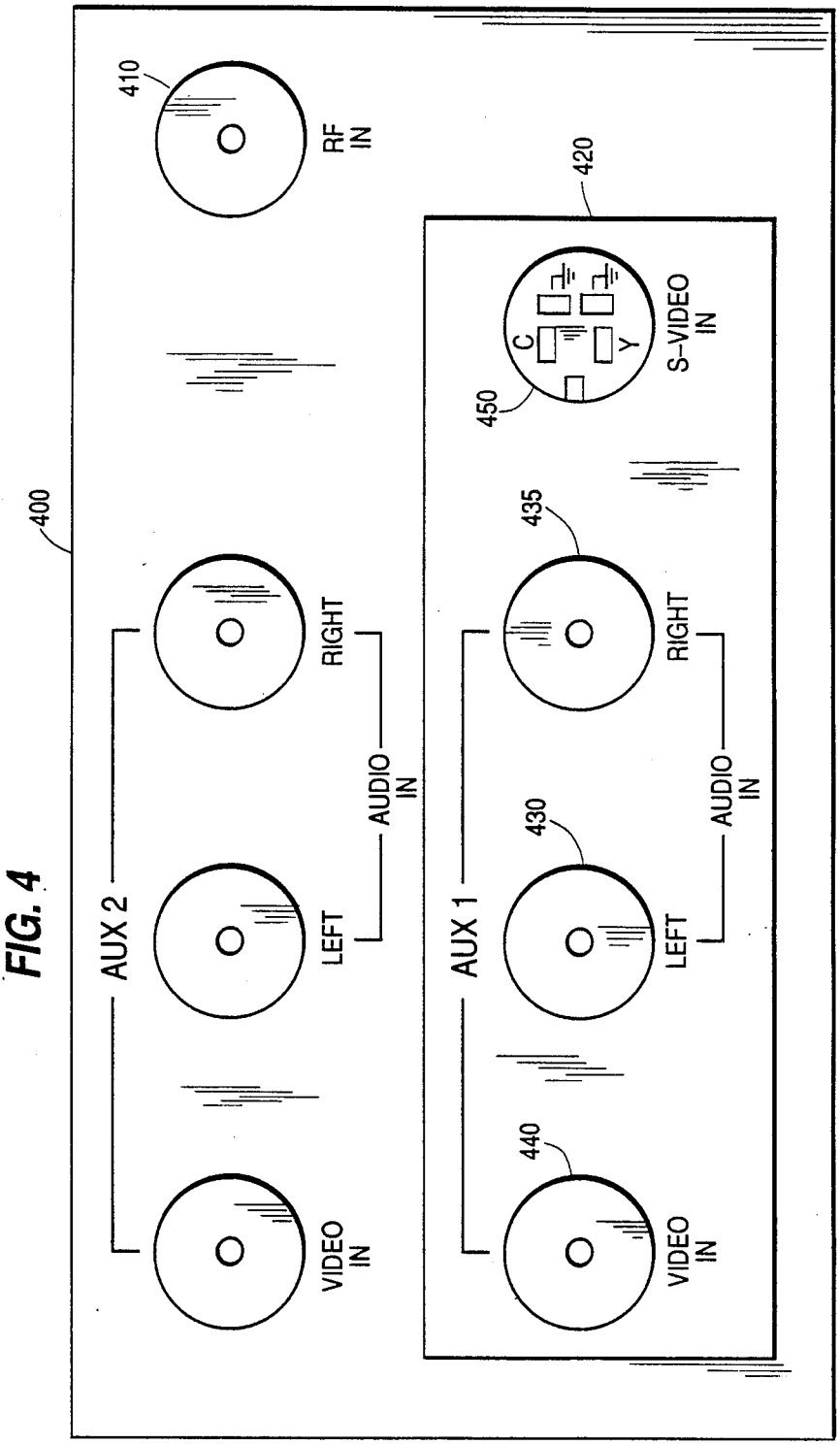
FIG. 4 illustrates, in pictorial form, a connector panel suitable for use in a television receiver employing the invention.

Referring to FIG. 4, a connector panel 400 includes an RF input connector 410 for receiving broadcast or cable radio frequency (RF) signals. Panel 400 also includes two groups of connectors AUX1 and AUX 2 for receiving baseband audio and baseband video signals, and a connector 450 labelled S-VIDEO IN for receiving wideband video signals from an S-VIDEO source such as, for example, an S-VHS (super-VHS) videocassette recorder.

S-VIDEO IN connector 450 does not include a terminal for receiving audio signals, and consequently separate accommodations must be made for receiving audio signals from an S-VIDEO source. It is herein recognized that separate dedicated audio input terminals need not be provided to receive audio signals from an S-VIDEO source, if the input terminals are grouped as shown in FIG. 4, or otherwise labelled to indicate that a single pair of audio input terminals may be "shared" between an auxiliary NTSC video signal source and an S-VIDEO signal source. Specifically, a "box". 420 is drawn or printed to enclose connectors having a relationship to one another. That is, if a standard NTSC video source is to be connected to panel 400, then the audio signals are connected to left and right AUDIO IN jacks 430 and 435, and the video signal is connected to VIDEO IN jack 440. If, however, an S-VIDEO source is to be connected to panel 400, then the video signal is connected to S-VIDEO jack 450, and the audio signals are connected to left and right AUDIO IN jacks 430 and 435. This results in an easy-to-use and easy-to-understand connection system for the user, and saves the manufacturing cost of adding two additional audio jacks. The table of FIG. 3 shows the audio source and video source selections corresponding to the four possible states of the binary signals on control lines C1 and C0. The X's in the table indicate the selections for each control code. Audio source AUX1 (corresponding to left and right AUDIO IN jacks 430 and 435) is selected in response to control codes 01 and 11 (i.e., AUX1 and S-VIDEO selections). Note that at least one "0" appears in each of the control codes except for the control code (i.e., 11) corresponding to the selection of the S-VIDEO source. Accordingly, in the circuitry of FIG. 2, a zero on either of control lines C1 or C0 will cause diode D231 or diode D232 to conduct through pull-up resistor R244 thereby forcing a low level signal to be developed at control input C of video switch 255 for all control codes except 11 (select S-VIDEO). Video switch unit 255 selects input signals from comb filter unit 250 whenever a low level signal is applied to control input C, and selects external S-VIDEO signals whenever a high level signal is applied to control input C.

Audio switch 240 selects a pair of input terminals (TV) in response to control code 00, a pair of input terminals (S-VIDEO/AUX1) in response to control code 01, a pair of input terminals (AUX2) in response to control code 10 and, the S-VIDEO/AUX1 input terminals once again in response to control code 11. This is accomplished by interconnecting wires 241 and 242 between respective terminals of the audio switch inputs selected by control codes 01 and 11 as shown in FIG. 2.

Figure 2A:
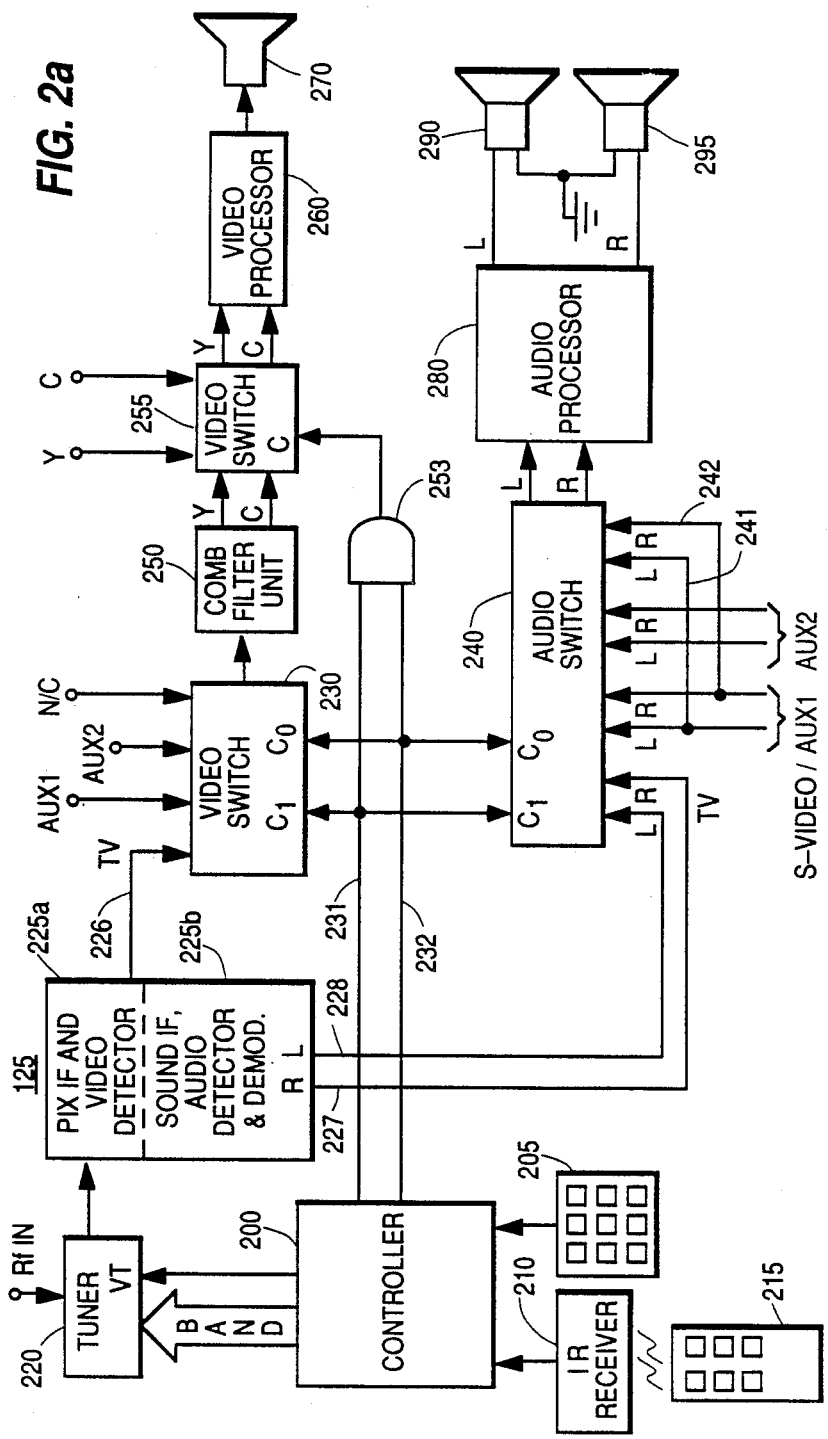

It is recognized that diodes D231 and D232 form an AND gate and may be replaced by a digital AND circuit 253 to accomplish that function as shown in FIG. 2a.

What is claimed is:

1. An audio and video switching arrangement, comprising:
video switch means having first, second third and fourth video signal inputs, first and second control signal inputs for receiving first and second control signals, and an output for developing a video signal selected in response to said control signals;
audio switch means having first, second, third, and fourth audio signal inputs, first and second control signal input coupled to said first and second control signal inputs of said video switch means for receiving said first and second control signals, and an output for developing an audio signal in response to said first and second control signals, said second and fourth audio signal inputs being connected together; and
control means for generating said first and second control signals;
said control signals defining four modes of operation wherein said first video signal and said first audio signal are selected in a first mode, said second video signal and said second audio signal are selected in a second mode, said third video signal and said third audio signal are selected in a third mode, and said fourth video signal and said second audio signal are selected in a fourth mode.

2. An audio/video switching arrangement, comprising:
first video switch means having first, second and third signal inputs for receiving first, second and third baseband video signals, respectively, having first and second control inputs for receiving respective control signals, and an output at which is developed a video signal selected from one of said first, second and third signal inputs in response to said control signals;

control means having first and second control outputs coupled to said first and second inputs of said first video switch means for generating said control signals;

audio switch means, having first, second, third and fourth signal inputs for receiving first, second third and fourth baseband audio signals, respectively, having first and second control inputs coupled to said first and second control inputs of said first video switch means, and having an output terminal at which is developed an audio signal selected from one of said first, second, third and fourth signal inputs in response to said first and second control signal and said second and fourth inputs being connected together;

second video switch means having a first input coupled to said output of said first video switch means, a second input for receiving a fourth video signal, a control input for receiving a third control signal, and an output at which is developed a video signal selected from signals at said first and second inputs of said second video switch means in response to said third control signal; and logic means having first and second inputs for receiving said first and second control signals, and an output for developing said third control signal in response to said first and second control signals;

said control signals defining four modes of operation wherein said first video signal and said first audio signal are selected in a first mode, said second video signal and said second audio signal are selected in a second mode, said third video signal and said third audio signal are selected in a third mode, and said fourth video signal and said second audio signal are selected in a fourth mode.

3. The switching arrangement of claim 2 wherein said logic means comprises an AND gate.

4. The switching arrangements of claim 3 wherein said AND gate comprises diode means having similar electrodes coupled together and coupled via a resistor means to a point of reference potential, the junction of said similar electrodes of said diode means and said resistor means forming the output of said AND gate.

5. The switching arrangement of claim 3 wherein said fourth video signal is an S-VIDEO signal.

6. An audio and video switching arrangement, comprising:

video switch means having first, second, and third video signal input for receiving first, second and third video signals respectively, a control signal input for receiving a video signal selection control signal, and an output for developing an output video signal selected from said first, second, and third input signals in response to said video signal selection control signal;

audio switch means having first and second audio signal inputs for receiving first and second audio signals respectively, a control signal input for receiving an audio selection control signal, and an output for developing an output audio signal selected from said first and second audio input signals in response to said audio selection control signal; and control means for generating said control signals for operating said video and audio switch means in three modes of operation in which said first video signal and said first audio signal are selected in a first mode, said second video signal and said second audio signal are selectee in a second mode, and said third video signal and said second audio signal are selected in a third mode of operation.

7. An audio and video switching arrangement, comprising:

video switch means having first and second video signal inputs for receiving first and second composite color video signals respectively, a pair of inputs for receiving luminance and chrominance component signals respectively, a control signal input for receiving a video signal selection control signal, and an output for developing a pair of output luminance and color component signals selected from luminance and color components derived from said first composite color video signal, luminance and color components derived from said second composite color video signal, and said luminance and chrominance component signals at said pair of inputs in response to said video signal selection control signal;

audio switch means having first and second audio signal inputs for receiving first and second audio signals respectively, a control signal input for receiving an audio selection control signal, and an output for developing an output audio signal selected from said first and second audio input signals in response to said audio selection control signal; and control means for generating said control signals for operating said video and audio switch means in three modes of operation in which said luminance and color components derived from said first composite color video signal and said first audio signal are selected in a first mode, said luminance and color components derived from said second composite color video signal and said second audio signal are selected in a second mode, and said luminance and chrominance component signals at said pair of inputs and said second audio signal are selected in a third mode of operation.

* * * * *

UNITED STATES PATENT AND TRADEMARK OFFICE
CERTIFICATE OF CORRECTION

PATENT NO. : 4,937,672

DATED : June 26, 1990

INVENTOR(S) : MARK R. ANDERSON

It is certified that error appears in the above-identified patent and that said Letters Patent is hereby corrected as shown below:

On the Title Sheet, under References Cited, U.S. PATENT DOCUMENTS, that portion reading "3,686,698" should read -- 4,686,698 --.

Signed and Sealed this

Eleventh Day of June, 1991

Attest:

HARRY F. MANBECK, JR.

*Attesting Officer*   *Commissioner of Patents and Trademarks*